(12) United States Patent
Mochizuki

(10) Patent No.: US 8,282,217 B2
(45) Date of Patent: Oct. 9, 2012

(54) PROJECTOR

(75) Inventor: Masamitsu Mochizuki, Fujimi (JP)

(73) Assignee: Seiko Epson Corporation (JP)

( * ) Notice: Subject to any disclaimer, the term of this patent is extended or adjusted under 35 U.S.C. 154(b) by 254 days.

(21) Appl. No.: 12/845,159

(22) Filed: Jul. 28, 2010

(65) Prior Publication Data

US 2011/0051096 A1 Mar. 3, 2011

(30) Foreign Application Priority Data

Aug. 28, 2009 (JP) ................................. 2009-197790

(51) Int. Cl.
*G03B 21/14* (2006.01)
(52) U.S. Cl. .......................................................... 353/34
(58) Field of Classification Search .................... 353/31, 353/33, 34, 37, 94; 349/5, 7, 8, 9; 362/555, 362/561, 84, 800
See application file for complete search history.

(56) References Cited

U.S. PATENT DOCUMENTS

| 7,316,484 B2 * | 1/2008 | Hatakeyama | 353/102 |
| 2010/0020289 A1 * | 1/2010 | Kamijima | 353/31 |
| 2010/0053564 A1 * | 3/2010 | Itoh | 353/37 |

FOREIGN PATENT DOCUMENTS

JP 2009-075151 4/2009

* cited by examiner

*Primary Examiner* — William C Dowling
(74) *Attorney, Agent, or Firm* — Harness, Dickey & Pierce, P.L.C.

(57) ABSTRACT

A projector includes: at least one light emitting device having a light emitting element adapted to emit a first outgoing light and a second outgoing light proceeding in a direction different from a direction of the first outgoing light; a first light modulation device adapted to modulate the first outgoing light in accordance with image information; a second light modulation device adapted to modulate the second outgoing light in accordance with image information; and a projection device adapted to project the light modulated by the first light modulation device and the light modulated by the second light modulation device, wherein the light emitting element is a super luminescent diode provided with a stacked structure having an active layer sandwiched between a first cladding layer and a second cladding layer, and the active layer has a first emission surface adapted to emit the first outgoing light and a second emission surface adapted to emit the second outgoing light.

8 Claims, 5 Drawing Sheets

PROJECTOR

BACKGROUND

1. Technical Field

The present invention relates to a projector.

2. Related Art

Recent years, laser elements with high luminance and superior in color reproducibility have become promising light emitting devices for light sources of projectors (see, e.g., JP-A-2009-75151). In the projectors using such light emitting devices, there is a known structure of providing two light modulation devices (e.g., light valves) to each of a red light source (the light emitting device), a blue light source (the light emitting device), and a green light source (the light emitting device) in order to realize a 3D projector. Such two light modulation devices for each color are also used for doubling the resolution of the image projected. In the case of providing the two light modulation devices to the light source of emitting each colored light, as a measure for inputting the light to each of the two light modulation devices, there can be cited, for example, a measure of adding an optical system for splitting the light emitted from a single light emitting element chip, and a measure of using two light emitting element chips for the light source of emitting a single colored light. However, in such measures, there arise problems of, for example, growth in size of the device and increase in manufacturing cost due to, for example, growth in size of the optical system and increase in the number of elements.

SUMMARY

An advantage of some aspects of the invention is to provide a projector in which the two light modulation devices can be provided to each of the single light sources for emitting respective colored light without adding an optical system for splitting the light, and thus, downsizing and cost reduction can be achieved.

According to an aspect of the invention, there is provided a projector including at least one light emitting device having a light emitting element adapted to emit a first outgoing light and a second outgoing light proceeding in a direction different from a direction of the first outgoing light, a first light modulation device adapted to modulate the first outgoing light in accordance with image information, a second light modulation device adapted to modulate the second outgoing light in accordance with image information, and a projection device adapted to project the light modulated by the first light modulation device and the light modulated by the second light modulation device, wherein the light emitting element is a super luminescent diode including a stacked structure having an active layer sandwiched between a first cladding layer and a second cladding layer, and the active layer has a first emission surface adapted to emit the first outgoing light and a second emission surface adapted to emit the second outgoing light.

According to the projector described above, the single light emitting element chip can emit the first outgoing light and the second outgoing light proceeding in the respective directions different from each other, and make the first outgoing light enter the first light modulation device and the second outgoing light enter the second light modulation device. Therefore, it is possible to provide a projector in which the two light modulation devices can be provided to each of the single light sources for emitting respective colored light without adding an optical system for splitting the light, and thus, downsizing and cost reduction can be achieved.

In the projector of the above aspect of the invention, it is also possible that at least part of the active layer constitutes at least one gain region formed by a current channel of the active layer, a plurality of the gain regions is arranged, a first surface and a second surface of exposed surfaces of the active layer are disposed opposite to each other in the stacked structure, a first gain region of the plurality of gain regions is disposed linearly from the first surface to the second surface so as to be tilted with respect to a perpendicular of the first surface toward a clockwise direction in a plan view of the active layer, a second gain region of the plurality of gain regions is disposed linearly from the first surface to the second surface so as to be tilted with respect to the perpendicular of the first surface toward a counterclockwise direction in the plan view of the active layer, the first emission surface corresponds to an end surface of the first gain region on the second surface, and the second emission surface corresponds to an end surface of the second gain region on the second surface.

According to the projector described above, the light emitting element chip can emit the first outgoing light and the second outgoing light proceeding in the respective directions different from each other, and make the first outgoing light enter the first light modulation device and the second outgoing light enter the second light modulation device. Therefore, it is possible to provide a projector in which the two light modulation devices can be provided to each of the single light sources for emitting respective colored light without adding an optical system for splitting the light, and thus, downsizing and cost reduction are possible.

In the projector of the above aspect of the invention, it is also possible that at least part of the active layer constitutes at least one gain region formed by a current channel of the active layer, a first surface and a second surface of exposed surfaces of the active layer are disposed opposite to each other in the stacked structure, the gain region is disposed linearly from the first surface to the second surface so as to be tilted with respect to a perpendicular of the first surface in a plan view of the active layer, the first emission surface corresponds to an end surface of the gain region on the first surface, the second emission surface corresponds to an end surface of the gain region on the second surface, and the light emitting device includes a first mirror adapted to guide the first outgoing light to the first light modulation device, and a second mirror adapted to guide the second outgoing light to the second light modulation device.

According to the projector described above, the single light emitting element chip can emit the first outgoing light and the second outgoing light proceeding in the respective directions different from each other, and make the first outgoing light enter the first light modulation device and the second outgoing light enter the second light modulation device. Therefore, it is possible to provide a projector in which the two light modulation devices can be provided to each of the single light sources for emitting respective colored light without adding an optical system for splitting the light, and thus, downsizing and cost reduction are possible.

In the projector of the above aspect of the invention, it is also possible that a plurality of gain regions described above is arranged.

According to such a projector, higher output can be achieved by a single light emitting element chip.

In the projector of the above aspect of the invention, it is also possible to further include a first diffractive optical element disposed on a light path of the first outgoing light between the light emitting device and the first light modulation device, and adapted to diffract the first outgoing light to thereby homogenize an intensity distribution of the light, and a second diffractive optical element disposed on a light path of the second outgoing light between the light emitting device and the second light modulation device, and adapted to diffract the second outgoing light to thereby homogenize an intensity distribution of the light.

According to the projector described above, it is possible to input the light with a homogenized intensity distribution into the first light modulation device and the second light modulation device.

In the projector of the above aspect of the invention, it is also possible that the first diffractive optical element and the second diffractive optical element are integrated.

According to such a projector as described above, since the number of components can be reduced, cost reduction and downsizing can be achieved.

In the projector of the above aspect of the invention, it is also possible that the first light modulation device and the second light modulation device are integrated.

According to such a projector as described above, since the number of components can be reduced, cost reduction and downsizing can be achieved.

In the projector of the above aspect of the invention, it is also possible that a plurality of light emitting devices described above is disposed, the plurality of light emitting devices emits light with colors different from each other, and the projector further comprises a color combining device adapted to combine a plurality of colored light each modulated by the first light modulation device and the second light modulation device.

According to such a projector as described above, an image with a plurality of colors combined can be projected.

BRIEF DESCRIPTION OF THE DRAWINGS

The invention will be described with reference to the accompanying drawings, wherein like numbers reference like elements.

DESCRIPTION OF AN EXEMPLARY EMBODIMENT

An exemplary embodiment of the invention will be hereinafter described with reference to the accompanying drawings.

1. Projector

Figure 1:
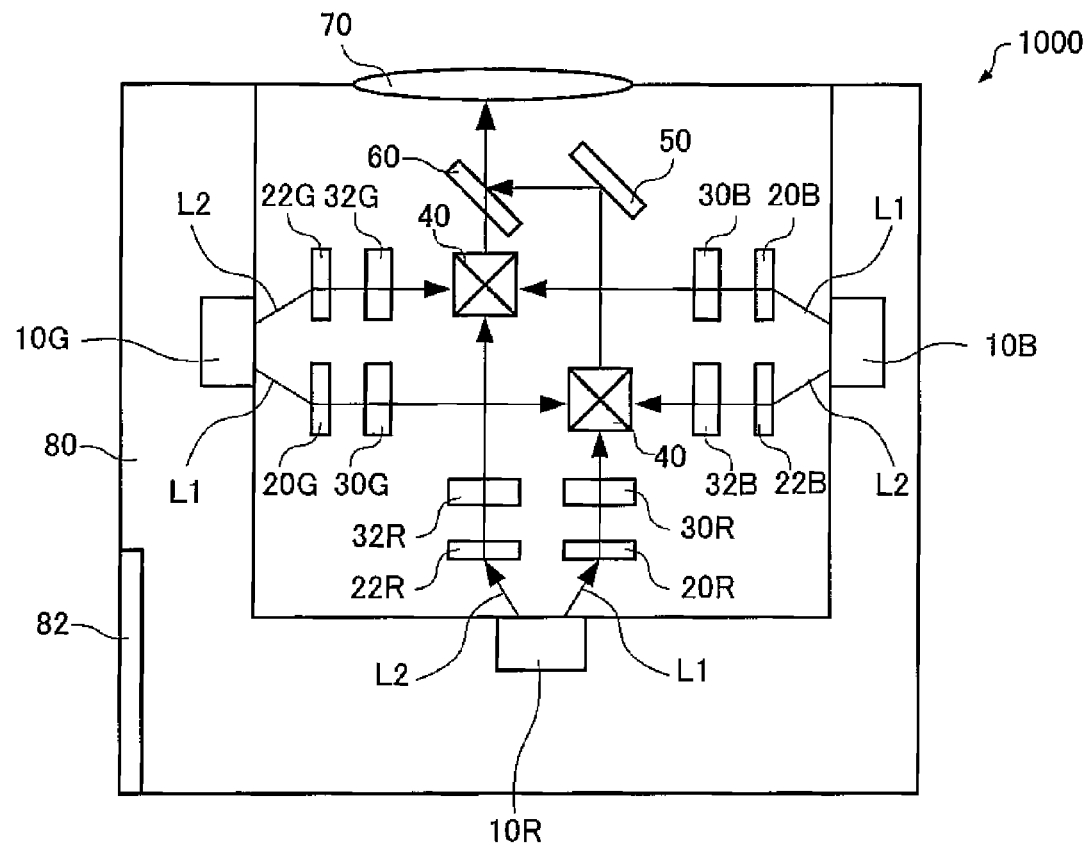
FIG. 1 is a diagram schematically showing a projector according to an embodiment of the invention.

Firstly, a projector 1000 according to the present embodiment will be explained. FIG. 1 is a diagram schematically showing the projector 1000. FIG. 1 shows light emitting devices 10R, 10G, and 10B in a simplified manner for the sake of convenience.

As shown in FIG. 1, the projector 1000 includes the light emitting devices 10R, 10G, and 10B, first light modulation devices 30R, 30G, and 30B, second light modulation devices 32R, 32G, and 32B, and a projection device 70. The projector 1000 can further include first diffractive optical elements 20R, 20G, and 20B, second diffractive optical elements 22R, 22G, and 22B, a color combining device 40, and a housing 80.

The light emitting devices 10R, 10G, and 10B are light sources of the projector 1000. As shown in FIG. 1, the projector 1000 is provided with the red light source (the light emitting device) 10R for emitting a red light, the green light source (the light emitting device) 10G for emitting a green light, the blue light source (the light emitting device) 10B for emitting a blue light. Hereinafter, the light emitting device 10R for emitting the red light will be explained as a representative of the light emitting devices 10R, 10G, and 10B.

Figure 2:
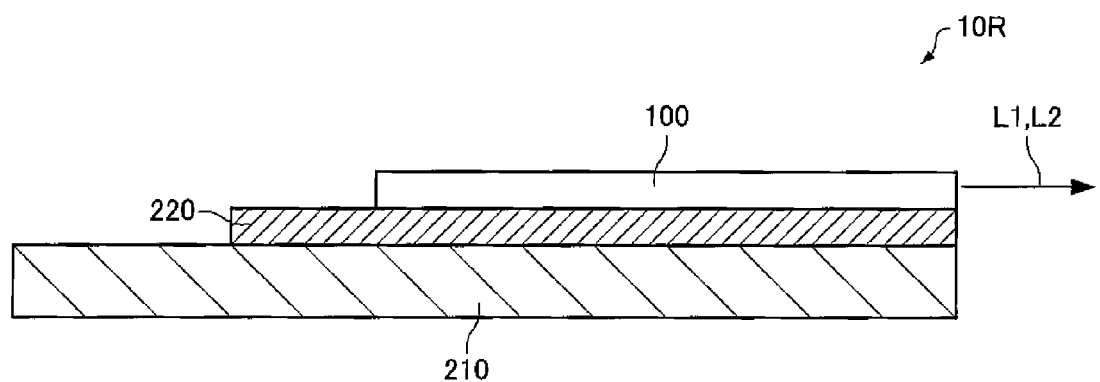
FIG. 2 is a cross-sectional view schematically showing a light emitting device of the projector according to the present embodiment.
Figure 3:
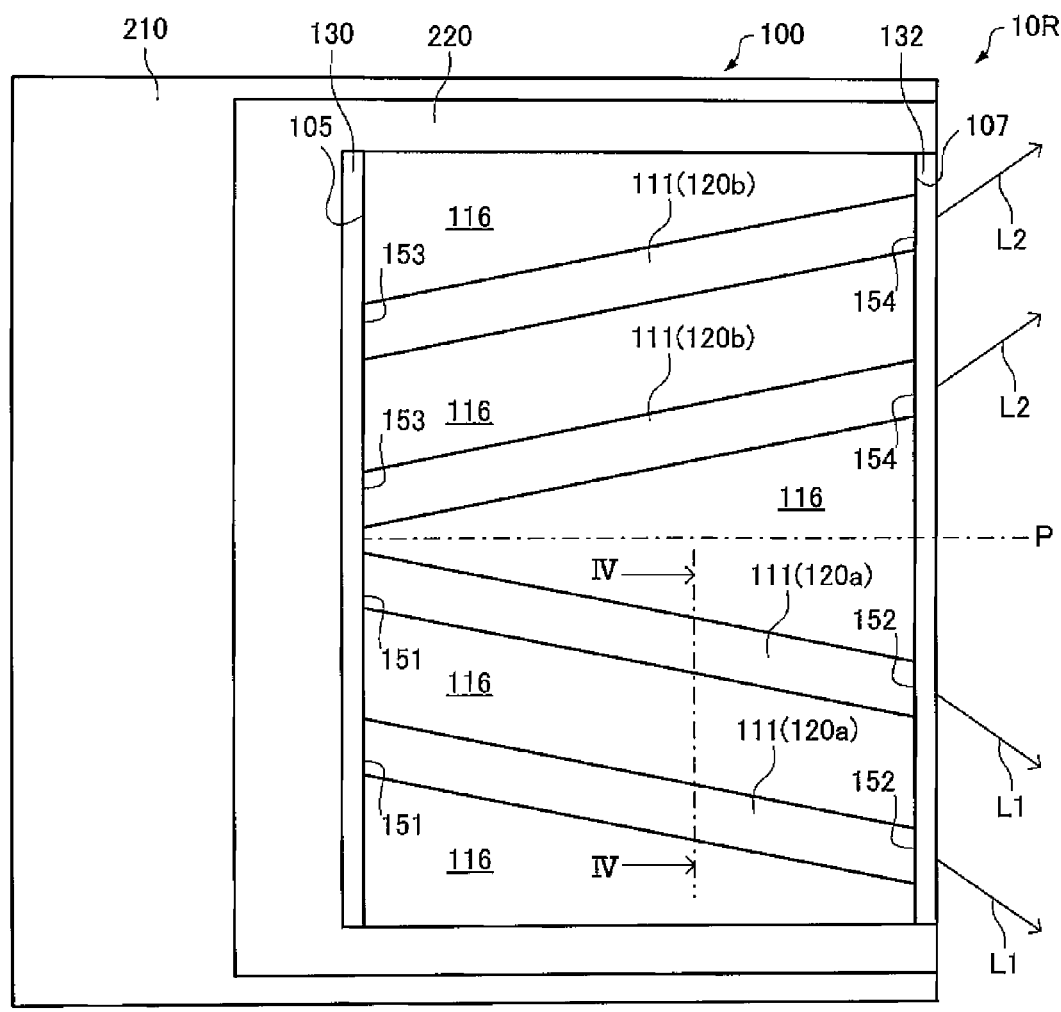
FIG. 3 is a plan view schematically showing the light emitting device of the projector according to the present embodiment.
Figure 4:
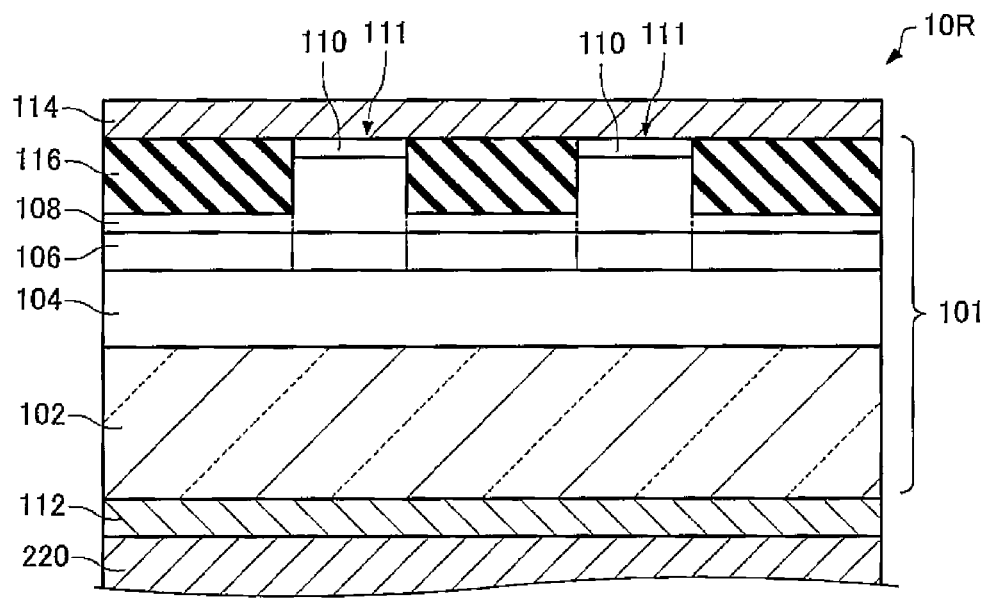
FIG. 4 is a cross-sectional view schematically showing a part of the light emitting device of the projector according to the present embodiment.

FIG. 2 is a cross-sectional view schematically showing the light emitting device 10R. FIG. 3 is a plan view schematically showing the light emitting device 10R. FIG. 4 is a partial enlarged view of a cross-section along the line IV-IV shown in FIG. 3. It should be noted that in FIG. 2 the light emitting element 100 is shown in a simplified manner for the sake of convenience. Further, in FIG. 3, the second electrode 114 is omitted from illustration for the sake of convenience. As shown in FIGS. 2 and 3, the light emitting device 10R has the light emitting element 100, a base section 210, and a submount 220.

As the light emitting element 100 a super luminescent diode (hereinafter also referred to as an "SLD") can be used. Thus, since the light emitting element 100 can emit light other than a laser, a speckle noise can be reduced when the projector 1000 illuminates a screen surface. The light emitting element 100 is, for example, an InGaAlP (red) type SLD.

As shown in FIG. 4, the light emitting element 100 has a stacked structure 101. The light emitting element 100 can further include insulating sections 116, a first electrode 112, and a second electrode 114. The stacked structure 101 can have a substrate 102, a first cladding layer 104, an active layer 106, a second cladding layer 108, and a contact layer 110.

As the substrate 102, a first conductivity type (e.g., an n-type) GaAs substrate, for example, can be used.

The first cladding layer 104 is formed on the substrate 102. The first cladding layer 104 is formed of, for example, a semiconductor of the first conductivity type. As the first cladding layer 104, for example, an n-type AlGaInP layer can be used. It should be noted that although not shown in the drawings, it is also possible to form a buffer layer between the substrate 102 and the first cladding layer 104. As the buffer layer, it is possible to use, for example, a GaAs layer or an InGaP layer of the first conductivity type (n-type) having crystallinity more preferable (e.g., the defect density lower) than that of the substrate 102.

The active layer 106 is formed on the first cladding layer 104. The active layer 106 is sandwiched between the first cladding layer 104 and the second cladding layer 108. The active layer 106 has, for example, a multiple quantum well (MQW) structure having three quantum well structures stacked one another each composed of an InGaP well layer and an AlGaInP barrier layer.

At least a part of the active layer 106 constitutes gain regions 120a, 120b forming current channels of the active layer 106. It is possible to generate light in the gain regions 120a, 120b, and the light can be provided with gains inside the gain regions 120a, 120b. The active layer 106 has a first surface 105, and a second surface 107 facing the first surface 105. The first surface 105 and the second surface 107 are, for example, parallel to each other. In the stacked structure 101, the first surface 105 and the second surface 107 are surfaces which are exposed without being covered by the first cladding layer 104 or the second cladding layer 108.

In the example shown in FIG. 3, parts of the active layer 106 form a first gain region 120a and a second gain region 120b. Although the numbers of the first gain region 120a and the second gain region 120b disposed in the example shown in FIG. 3 are both two, they are not particularly limited. For example, by increasing the numbers of the first and the second gain regions 120a, 120b, higher output can be achieved. The planar shape of each of the first gain region 120a and the second gain region 120b is, for example, a parallelogram as shown in FIG. 3. The first gain region 120a and the second gain region 120b are disposed linearly from the first surface 105 to the second surface 107 so as to be tilted with respect to perpendicular P, and the directions of which are different from each other. Therefore, it is possible to emit first outgoing light L1 from an end surface 152 of the first gain region 120a on the second surface 107 and second outgoing light L2 from an end surface 154 of the second gain region 120b on the second surface 107 in respective directions different from each other. Further, the laser oscillation of the light generated in the gain regions 120a, 120b can be suppressed or prevented. More specifically, as shown in FIG. 3, the first gain region 120a is disposed linearly from the first surface 105 to the second surface 107 so as to be tilted in a clockwise direction with respect to the perpendicular P of the first surface 105 in a plan view of the active layer 106. It can also be said that the first gain region 120a is disposed, for example, linearly from the first surface 105 to the second surface 107 so that the angle thereof with respect to the perpendicular P in the clockwise direction becomes an acute angle. The second gain region 120b is disposed linearly from the first surface 105 to the second surface 107 so as to be tilted in a counterclockwise direction with respect to the perpendicular P of the first surface 105 in a plan view of the active layer 106. It can also be said that the second gain region 120b is disposed, for example, linearly from the first surface 105 to the second surface 107 so that the angle thereof with respect to the perpendicular P in the counterclockwise direction becomes an acute angle. The tilt angle of the first gain region 120a with respect to the perpendicular P and the tilt angle of the second gain region 120b with respect to the perpendicular P are the same in the example shown in the drawing, but can be different from each other.

In the wavelength region of light generated in the gain regions 120a, 120b, the reflectance of the first surface 105 is higher than that of the second surface 107. For example, as shown in FIG. 3, the high reflectance can be obtained by covering the first surface 105 with a reflection section 130. The reflection section 130 has a highly reflective structure such as a dielectric mirror or a metallic mirror. Specifically, as the reflection section 130, a mirror having 4 pairs of layers of SiON and SiN stacked in this order from the side of the first surface 105 can be used, for example. It is preferable that the reflectance of the first surface 105 is 100% or approximately 100%. In contrast thereto, it is preferable that the reflectance of the second surface 107 is 0% or approximately 0%. For example, by covering the second surface 107 with an antireflection section 132, the low reflectance can be obtained. As the antireflection section 132, a single layer of $Al_2O_3$, for example, can be used. Specifically, in the light emitting element 100, a second end surface 152 of the first gain region 120a and a fourth end surface 154 of the second gain region 120b become emission surfaces, and a first end surface 151 of the first gain region 120a on the first surface 105 and a third end surface 153 of the second gain region 120b on the first surface 105 become reflecting surfaces. It should be noted that the reflection section 130 and the antireflection section 132 are not limited to the examples described above, but an $SiO_2$ layer, an SiN layer, an SiON layer, a $Ta_2O_5$ layer, a $TiO_2$ layer, a TiN layer, and a multilayer film of these layers, for example, can be used as these sections.

The second cladding layer 108 is formed on the active layer 106. The second cladding layer 108 is made of, for example, a semiconductor of a second conductive type (e.g., a p-type). As the second cladding layer 108, a p-type AlGaInP layer, for example, can be used.

For example, a pin diode is composed of the p-type second cladding layer 108, the active layer 106 with no impurity doped, and the n-type first cladding layer 104. Each of the first cladding layer 104 and the second cladding layer 108 has a forbidden bandgap larger than that of the active layer 106 and a refractive index smaller than that of the active layer 106. The active layer 106 has a function of amplifying the light. The first and the second cladding layer 104, 108 sandwiching the active layer 106 have a function of confining injected carriers (electrons and holes) and the light in the active layer.

As shown in FIG. 4, the contact layer 110 is formed on the second cladding layer 108. As the contact layer 110, a layer having ohmic contact with the second electrode 114 can be used. As the contact layer 110, a p-type GaAs layer, for example, can be used.

The contact layer 110 and part of the second cladding layer 108 can form columnar sections 111. As shown in FIG. 3, for example, the planar shape of each of the columnar sections 111 is the same as that of corresponding gain regions 120a, 120b. In other words, the planar shape of the columnar section 111 determines the current channel between the electrodes 112, 114, for example, and as a result, the planar shapes of the gain regions 120a, 120b are determined. It should be noted that although not shown in the drawings, each of the columnar sections 111 can also be constituted with, for example, the contact layer 110, part of the second cladding layer 108, part of the active layer 106, and part of the first cladding layer 104. It should be noted that although not shown in the drawings, the side surfaces of each of the columnar sections 111 can be inclined.

As shown in FIG. 4, the insulating sections 116 can be disposed on the second cladding layer 108 laterally to the columnar sections 111. The insulating sections 116 are contact with the side surfaces of the columnar sections 111. The upper surfaces of the insulating sections 116 can be contiguous to the upper surface of the contact layer 110. As the insulating sections 116, for example, an SiN layer, an $SiO_2$ layer, and a polyimide layer can be used. If such materials are used as the insulating sections 116, the current between the electrodes 112, 114 can flow through the columnar sections 111 sandwiched between the insulating sections 116 avoiding the insulating sections 116. It is possible for the insulating sections 116 to have a refractive index smaller than that of the active layer 106. In this case, the effective refractive index of the vertical cross-section in which the insulating section 116 is provided becomes smaller than that of the vertical cross-section in which the insulating section 116 is not provided, namely the columnar section 111 is provided. Thus, it becomes possible to efficiently confine the light inside the gain regions 120a, 120b with respect to the planar direction. Further, it is also possible to eliminate the insulating sections 116. In other words, the insulating sections 116 can be an air. In this case, it is required to exclude the active layer 106 and the first cladding layer 104 from the columnar sections 111, or to prevent the second electrode 114 from being direct contact with the active layer 106 and the first cladding layer 104. In the example described above, there explained an index guide type structure which a refractive index difference is provided in order to confine the light. Specifically, the refractive index difference is provided between the region which the insulating sections 116 are formed and the region which the insulating sections 116 are not formed, namely the region which the columnar section 111 is formed. However, it is also possible to use a gain guiding type structure which the gain regions 120a, 120b are directly used as the guiding regions without providing the refractive index difference by forming the columnar sections 111.

The first electrode 112 is formed on the entire bottom surface of the substrate 102. The first electrode 112 can be contact with the layer (the substrate 102 in the example shown in the drawings) having ohmic contact with the first electrode 112. Thus, the contact resistance of the first electrode 112 can be reduced. The first electrode 112 is electrically connected to the first cladding layer 104 via the substrate 102. The first electrode 112 is the one electrode for driving the light emitting element 100. As the first electrode 112, for example, stacking layers of a Cr layer, an AuGe layer, an Ni layer, and an Au layer in this order from the side of the substrate 102 can be used. It should be noted that it is also possible to dispose a second contact layer (not shown) between the first cladding layer 104 and the substrate 102, expose the second contact layer using a dry etching process or the like, and then dispose the first electrode 112 on the second contact layer. Thus, a single-sided electrode structure can be obtained. This form is particularly effective in the case which the substrate 102 is an insulating member.

The second electrode 114 can be formed on the entire upper surface of the contact layer 110 (the columnar sections 111) and the insulating sections 116. The second electrode 114 is electrically connected to the second cladding layer 108 via the contact layer 110. The second electrode 114 is the other electrode for driving the light emitting element 100. As the second electrode 114, for example, stacking a Cr layer, an AuZn layer, and an Au layer in this order from the side of the contact layer 110 can be used. As shown in FIG. 3, the contact surface between the second electrode 114 and the contact layer 110 has a planar shape substantially the same as that of the gain regions 120a, 120b.

In the light emitting element 100, when applying a forward bias voltage of the pin diode between the first electrode 112 and the second electrode 114, there occurs recombination of electrons and holes in the gain regions 120a, 120b of the active layer 106. The recombination causes a spontaneous emission of light. Originating from the spontaneous emission, the stimulated emission occurs in a chained manner, and the intensity of light is amplified inside the gain regions 120a, 120b. The light generated in the first gain region 120a is emitted from the second end surface (a first emission surface) 152 as the first outgoing light L1. The light generated in the second gain region 120b is emitted from the fourth end surface (a second emission surface) 154 as the second outgoing light L2. In other words, the active layer 106 can include the first emission surface 152 for emitting the first outgoing light L1 and the second emission surface 154 for emitting the second outgoing light L2. Since the first gain region 120a and the second gain region 120b are tilted with respect to the perpendicular P toward the respective directions different from each other, it is possible to emit the first outgoing light L1 and the second outgoing light L2 toward respective directions different from each other. Therefore, the light emitting element 100 can make the first outgoing light L1 and the second outgoing light L2 be emitted from a single light emitting element chip, then make the first outgoing light L1 enter the first light modulation device 30R and the second outgoing light L2 enter the second light modulation section 32R via the first diffractive optical element 20R and the second diffractive optical element 22R, respectively.

The base section 210 can support the light emitting element 100 indirectly via the sub-mount 220, for example. As the base section 210, for example, a member having a plate-like shape (a rectangular solid shape) can be used. As the base section 210, Cu, Al, for example, can be used. Although not shown in the drawings, the light emitting element 100 can also be electrically connected to the electrodes on the sub-mount 220 by, for example, wire bonding.

The sub-mount 220 can directly support the light emitting element 100. As shown in FIG. 2, the sub-mount 220 is formed on the base section 210. On the sub-mount 220, there is formed the light emitting element 100. As the sub-mount 220, for example, a member having a plate-like shape can be used. It should be noted that it is also possible that the base section 210 directly supports the light emitting element 100 without providing the sub-mount 220, for example. As the sub-mount 220, for example, a BeO or an AlN can be used.

The thermal conductivities of the base section 210 and the sub-mount 220 are higher than that of the light emitting element 100, for example. Thus, the base section 210 and the sub-mount 220 can function as a heat sink.

Although the light emitting device 10R for emitting the red light is explained hereinabove as the representative of the light emitting devices 10R, 10G, and 10B of the projector 1000, the same can be applied to the other light emitting devices 10G, 10B. It is possible to obtain the green light emitting device 10G and the blue light emitting device 10B by changing the materials of the light emitting elements 100.

It should be noted that the light emitting devices 10R, 10G, and 10B can be manufactured by the following process.

Firstly, the first cladding layer 104, the active layer 106, the second cladding layer 108, the contact layer 110 are epitaxially grown in this order on the substrate 102 by using, for example, a metal organic chemical vapor deposition (MOCVD) method. Subsequently, the contact layer 110 and the second cladding layer 108 are patterned to form the columnar sections 111 by using, for example, a photolithography technology and an etching technology. Subsequently, the insulating sections 116 are formed so as to cover the columnar section 111. Specifically, an insulating layer is formed firstly as a film above the second cladding layer 108 (including the contact layer 110) using, for example, a chemical vapor deposition (CVD) method or a coating method. Subsequently, the upper surface of the contact layer 110 is exposed using, for example, a photolithography technology and an etching technology. According to the process described hereinabove, the insulating sections 116 can be formed. Subsequently, a conductive layer is formed using, for example, a vacuum vapor deposition method, thereby forming the first electrode 112 and the second electrode 114. According to the process described hereinabove, the light emitting element 100 can be formed.

Subsequently, the light emitting element 100 is mounted on the sub-mount 220 and the base section 210. It is also possible to electrically connect the light emitting element 100 to the sub-mount 220 and the base section 210 by using, for example, a wire bonding process.

According to the process described hereinabove, the light emitting devices 10R, 10G, and 10B can be obtained.

As shown in FIG. 1, the first diffractive optical elements 20R, 20G, and 20B are optical elements for diffracting the first outgoing light L1 to thereby homogenize the intensity distribution of the light. The first diffractive optical elements 20R, 20G, and 20B are disposed on the light paths between the light emitting devices 10R, 10G, and 10B and the first light modulation devices 30R, 30G, and 30B, respectively. It is possible for the first diffractive optical elements 20R, 20G, and 20B to homogenize the intensity distribution of the first outgoing light L1 and then input the first outgoing light L1 into the first light modulation devices 30R, 30G, and 30B, respectively.

The second diffractive optical elements 22R, 22G, and 22B are optical elements for diffracting the second outgoing light L2 to thereby homogenize the intensity distribution of the light. The second diffractive optical elements 22R, 22G, and 22B are disposed on the light paths between the light emitting devices 10R, 10G, and 10B and the second light modulation devices 32R, 32G, and 32B, respectively. It is possible for the second diffractive optical elements 22R, 22G, and 22B to homogenize the intensity distribution of the second outgoing light L2 and then input the second outgoing light L2 into the second light modulation devices 32R, 32G, and 32B, respectively.

As the diffractive optical elements 20R, 20G, 20B, 22R, 22G, and 22B, there can be used, for example, computer generated hologram (hereinafter referred to as a "CGH") obtained by forming a relief structure created artificially on a glass substrate in accordance with calculation by a computer. The CGH is a wavefront conversion element for converting the wave front of the incident light utilizing the diffraction phenomenon. The CGH can generate a homogenized or a simple shape intensity distribution of light, and therefore can preferably be used for illuminating the light modulation devices 30R, 30G, 30B, 32R, 32G, and 32B. Further, the CGH makes it possible to freely set the divisional areas of a diffraction grating, for example, and therefore can suppress or prevent aberrations. It should be noted that the outgoing light L1, L2 entering the diffractive optical elements 20R, 20G, 20B, 22R, 22G, and 22B can be converted into parallel light by collimating lenses (not shown). Thus, it becomes possible to input the parallel light into the diffractive optical elements 20R, 20G, 20B, 22R, 22G, and 22B.

The first light modulation devices 30R, 30G, and 30B are capable of modulating the first outgoing light L1 emitted from the respective light emitting devices 10R, 10G, and 10B in accordance with the image information, respectively. In other words, it is possible for light modulation devices 30R, 30G, and 30B to modulate the first outgoing light L1 entering via the first diffractive optical elements 20R, 20G, and 20B respectively in accordance with the image information, and then input the first outgoing light L1 into the color combining device 40.

The second light modulation devices 32R, 32G, and 32B are capable of modulating the second outgoing light L2 emitted from the respective light emitting devices 10R, 10G, and 10B in accordance with the image information, respectively. In other words, it is possible for the second light modulation devices 32R, 32G, 32B to modulate the second outgoing light L2 entering via the second diffractive optical elements 22R, 22G, and 22B respectively in accordance with the image information, and then input the second outgoing light L2 into the color combining device 40.

As the first light modulation devices 30R, 30G, and 30B and the second light modulation devices 32R, 32G, and 32B, a transmissive liquid crystal light valve and a reflective liquid crystal light valve can be used, for example. Further, light valves other than liquid crystal light valves can also be used.

The color combining device 40 is an optical element for combining the plurality of colored light modulated by the first light modulation devices 30R, 30G, and 30B and the second light modulation devices 32R, 32G, and 32B, and inputting the combined colored light into the projection device 70. Therefore, the projector 1000 can project an image with a plurality of colors combined. As the color combining device 40, a cross dichroic prism can be used, for example. The cross dichroic prism is formed by bonding four right angle prisms to each other, and on the interfaces on which the right angle prisms are bonded to each other, there are formed two dielectric multilayer films. For example, the dielectric multilayer films transmits the red and green colored light and reflects the blue colored light and the other of the dielectric multilayer films transmits the green and the blue colored light and reflects the red colored light, thereby achieving to combine the three colored light. The color combining device 40 is provided to each of the groups of first light modulation devices 30R, 30G, and 30B and the second light modulation devices 32R, 32G, and 32B. The combined light emitted from the two color combining devices 40 enters the projection device via the reflecting mirror 50 and a half mirror 60, respectively. It should be noted that although the case in which the cross dichroic prism is used as the color combining device 40 is explained here, it is also possible to use, for example, a device having dichroic mirrors in a cross arrangement to thereby combine the colored light or a device having dichroic mirrors in parallel to each other to thereby combine the colored light as the color combining device 40.

The projection device 70 is capable of projecting the light thus combined by the color combining devices 40 on a screen (not shown) in an enlarged manner with a desired magnification ratio. The projection device 70 can be formed of, for example, a projection lens.

The housing 80 can house, for example, the light emitting devices 10R, 10G, and 10B, the first light modulation devices 30R, 30G, and 30B, the second light modulation devices 32R, 32G, and 32B, the projection device 70, the first diffractive optical elements 20R, 20G, and 20B, the second diffractive optical elements 22R, 22G, and 22B, and the cross dichroic prisms 40. The light emitting devices 10R, 10G, and 10B are fixed to the housing 80. The housing 80 has a heat sink, a Peltier element, and so on, and is therefore capable of spreading the heat of the light emitting devices 10R, 10G, and 10B. It is also possible to provide the housing 80 with, for example, cooling fans 82 (only an intake or exhaust fan is shown in FIG. 1).

The projector 1000 according to the present embodiment has features as described below, for example.

In the projector 1000 according to the present embodiment, the active layer 106 of the light emitting element 100 can be provided with the first emission surface 152 for emitting the first outgoing light L1 and the second emission surface 154 for emitting the second outgoing light L2. Therefore, the light emitting element 100 can emit the first and the second outgoing light L1, L2 proceeding in respective directions different from each other from one light emitting element chip and thereby respectively make the first outgoing light L1 input into the first light modulation devices 30R, 30G, and 30B and the second outgoing light L2 input into the second light modulation devices 32R, 32G, and 32B. Therefore, downsizing can be achieved in the projector having two light modulation devices for every light emitting device (light source) for emitting one colored light compared to the case of adding an optical system for splitting the light emitted from one light emitting element chip or the case of using two light emitting element chips as the light source. Further, the cost can also be reduced compared to these cases. Thus, the downsizing and the cost reduction of, for example, 3D projectors and the projectors capable of improving the resolution of shot images can be achieved.

In the projector 1000 according to the present embodiment, the light emitting devices 10R, 10G, and 10B can be SLDs. Therefore, the speckle noise can be reduced when the projector 1000 illuminates a screen surface. Thus, it becomes possible to provide a projector capable of displaying clear images without local glaringness.

2. Modified Examples

Then, modified examples of the projector according to the present embodiment will be explained. It should be noted that points which the modified examples are different from the example of the projector 1000 described above will be explained, and points which the modified examples are the same as the example of the projector 1000 will be denoted with the same reference numerals and the explanation therefor will be omitted.

2-1. First Modified Example

Figure 5:
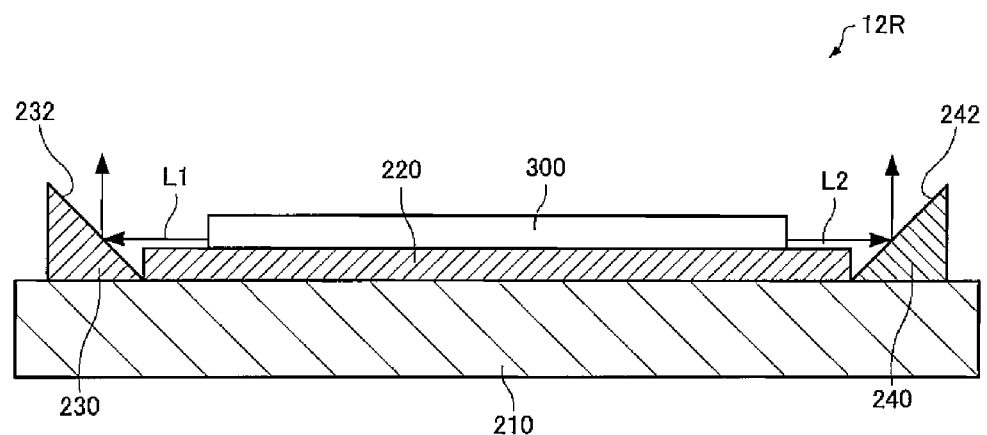
FIG. 5 is a cross-sectional view schematically showing a light emitting device of the projector according to a first modified example.
Figure 6:
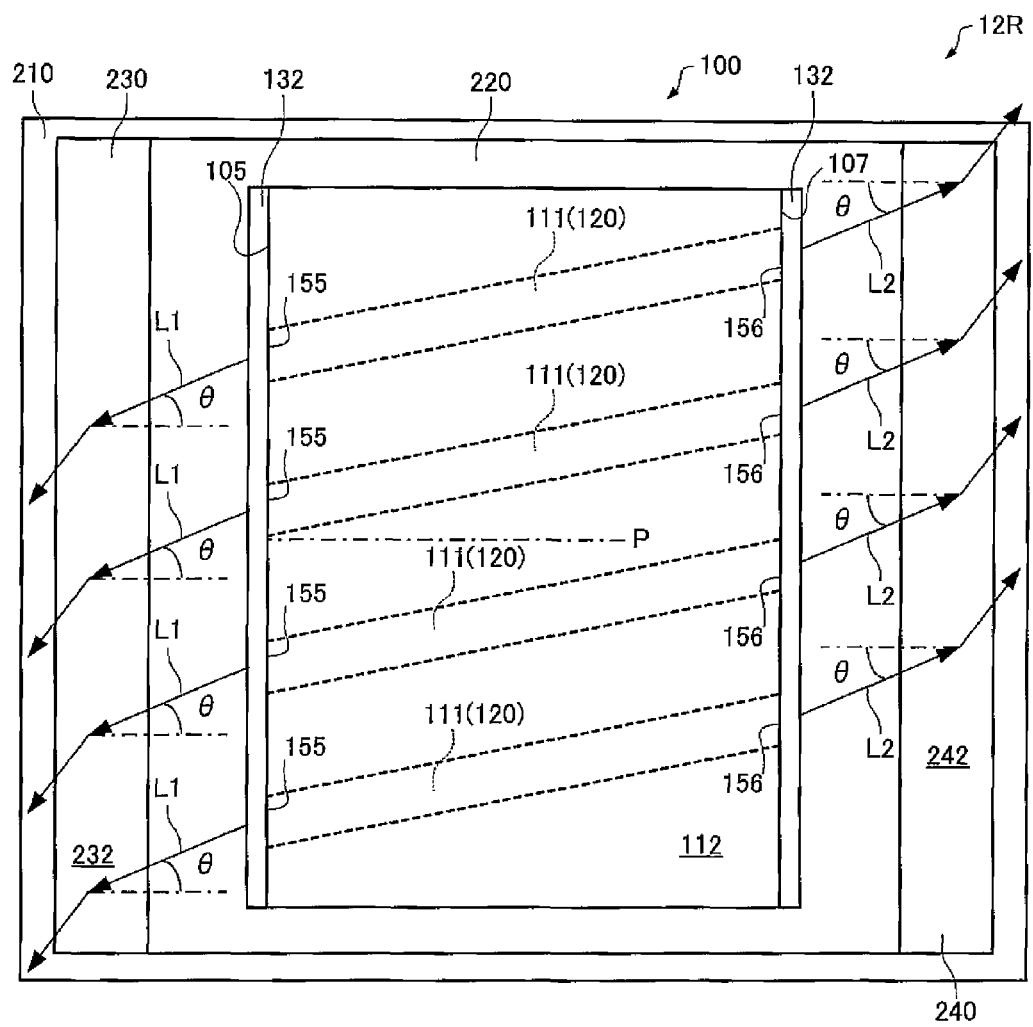
FIG. 6 is a plan view schematically showing the light emitting device of the projector according to the first modified example.

Firstly, a first modified example will be explained. In the example of the projector 1000, the case of using the light emitting devices 10R, 10G, and 10B as the light sources, each having the light emitting element 100 in which the first and the second gain regions 120*a*, 120*b* having different tilt angles with respect to the perpendicular P are arranged is explained. In the projector according to the present modified example, there can be used light emitting devices 12R, 12G, and 12B as the light sources, each having a light emitting element 300 in which gain regions 120 having the same tilt angles with respect to the perpendicular P are arranged. Hereinafter, the light emitting device 12R for emitting the red light will be explained as a representative of the light emitting devices 12R, 12G, and 12B. FIG. 5 is a cross-sectional view schematically showing the light emitting device 12R. FIG. 6 is a plan view of the light emitting device 12R. It should be noted that in FIG. 5 the light emitting element 300 is shown in a simplified manner for the sake of convenience.

As shown in FIG. 5, the light emitting device 12R can include the light emitting element 300, the base section 210, the sub-mount 220, a first light axis conversion element 230 having a first mirror 232, and a second light axis conversion element 240 having a second mirror 242.

The light emitting element 300 can be flip-chip-mounted on the sub-mount 220 with the surface of the second electrode 114 facing the surface of the sub-mount 220 (junction down). Thus, since the active layer 106 can be provided on the sub-mount 220 and the base section 210, the light emitting device 12R superior in heat spreading property can be obtained.

As shown in FIG. 6, the light emitting element 300 is provided with the gain region 120 disposed linearly from the first surface 105 to the second surface 107 so as to be tilted with respect to the perpendicular P of the first surface 105 in a plan view of the active layer 106. Thus, the laser oscillation of the light generated in the gain regions 120 can be suppressed or prevented. Further, the first surface 105 and the second surface 107 of the active layer 106 can be covered with, for example, the antireflection section 132. In the light emitting element 300, a fifth end surface 155 on the first surface 105 of each of the gain regions 120 and a sixth end surface 156 on the second surface 107 of each of the gain regions 120 form the emission surfaces. Thus, it becomes possible to emit the light generated in each of the gain regions 120 from the fifth end surface (the first emission surface) 155 as the first outgoing light L1, and from the sixth end surface (the second emission surface) 156 as the second outgoing light L2. The first outgoing light L1 and the second outgoing light L2 can be emitted in a direction tilted with an angle larger than the tilt angle of the gain regions 120 with respect to the perpendicular P. Although in the example shown in the drawing four gain regions 120 are arranged, the number thereof is not particularly limited. By increasing the number of the gain regions 120, higher output can be achieved.

The first light axis conversion element 230 and the second light axis conversion element 240 are formed on, for example, the base section 210. The first light axis conversion element 230 has the first mirror 232. The second light axis conversion element 240 has the second mirror 242. The mirrors 232, 242 are tilted, for example, 45 degrees with respect to the upper surface of the active layer 106. As the material of the light axis conversion elements 230, 240, aluminum, silver, gold can be cited, for example. It is also possible that only the portions of the mirrors 232, 242 of the light axis conversion elements 230, 240 are formed by the material cited above.

The first mirror 232 is disposed so as to be opposed to the first surface 105, for example. The first mirror 232 is capable of reflecting the first outgoing light L1 emitted from the fifth end surface 155. Specifically, as shown in FIG. 5, the first outgoing light L1 proceeding in the direction from the second surface 107 toward the first surface 105 (e.g., in a horizontal direction) can be reflected in a thickness direction (e.g., in a vertical direction) of the active layer 106. Here, as shown in FIG. 6, the first outgoing light L1 enters the first mirror 232 with a tilt angle of θ in a plan view of the light emitting device 12R. Therefore, the first mirror 232 can reflect the first outgoing light L1 in a direction tilted with the angle θ with respect to the vertical direction. The second mirror 242 is disposed so as to be opposed to the second surface 107, for example. The second mirror 242 is capable of reflecting the second outgoing light L2 emitted from the sixth end surface 156. Specifically, the second outgoing light L2 proceeding in the direction from the first surface 105 toward the second surface 107 (e.g., in the horizontal direction) can be reflected in a thickness direction (e.g., in the vertical direction) of the active layer 106. Here, as shown in FIG. 6, the second outgoing light L2 enters the second mirror 242 with a tilt angle of θ in a plan view of the light emitting device 12R. Therefore, the second mirror 242 can reflect the second outgoing light L2 in a direction tilted with the angle θ with respect to the vertical direction. In other words, in the light emitting device 12R, it is possible to make the first outgoing light L1 and the second outgoing light L2 proceed in the respective directions opposed to each other and enter the respective mirrors 232, 242 with the angle θ. Therefore, it becomes possible to make the first outgoing light L1 reflected by the first mirror 232 and the second outgoing light L2 reflected by the second mirror 242 proceed in the respective directions different from each other and thereby make the first outgoing light L1 enter the first light modulation device 30R and the second outgoing light L2 enter the second light modulation device 32R.

Although the red light emitting device 12R is explained as a representative example of the light emitting devices 12R, 12G, and 12B, the same can be applied to the green and the blue light emitting device 12G, 12B.

In the projector according to the present modified example, the active layer 106 of the light emitting element 300 can be provided with the first emission surface 155 for emitting the first outgoing light L1 and the second emission surface 156 for emitting the second outgoing light L2. Further, the first mirror 232 for reflecting the first outgoing light L1 and the second mirror 242 for reflecting the second outgoing light L2 can also be provided. Thus, it becomes possible to make the first outgoing light L1 and the second outgoing light L2 proceed in the respective directions different from each other and thereby make the first outgoing light L1 enter the first light modulation devices 30R, 30G, and 30B and the second outgoing light L2 enter the second light modulation devices 32R, 32G, and 32B. Therefore, downsizing can be achieved in the projector having two light modulation devices for every light emitting device (light source) for emitting one colored light compared to the case of adding an optical system for splitting the light emitted from one light emitting element chip, or the case of using two light emitting element chips as the light source. Further, the cost can also be reduced compared to these cases. Thus, the downsizing and the cost reduction of, for example, 3D projectors, or the projectors capable of improving the resolution of shot images can be achieved.

2-2. Second Modified Example

Figure 7:
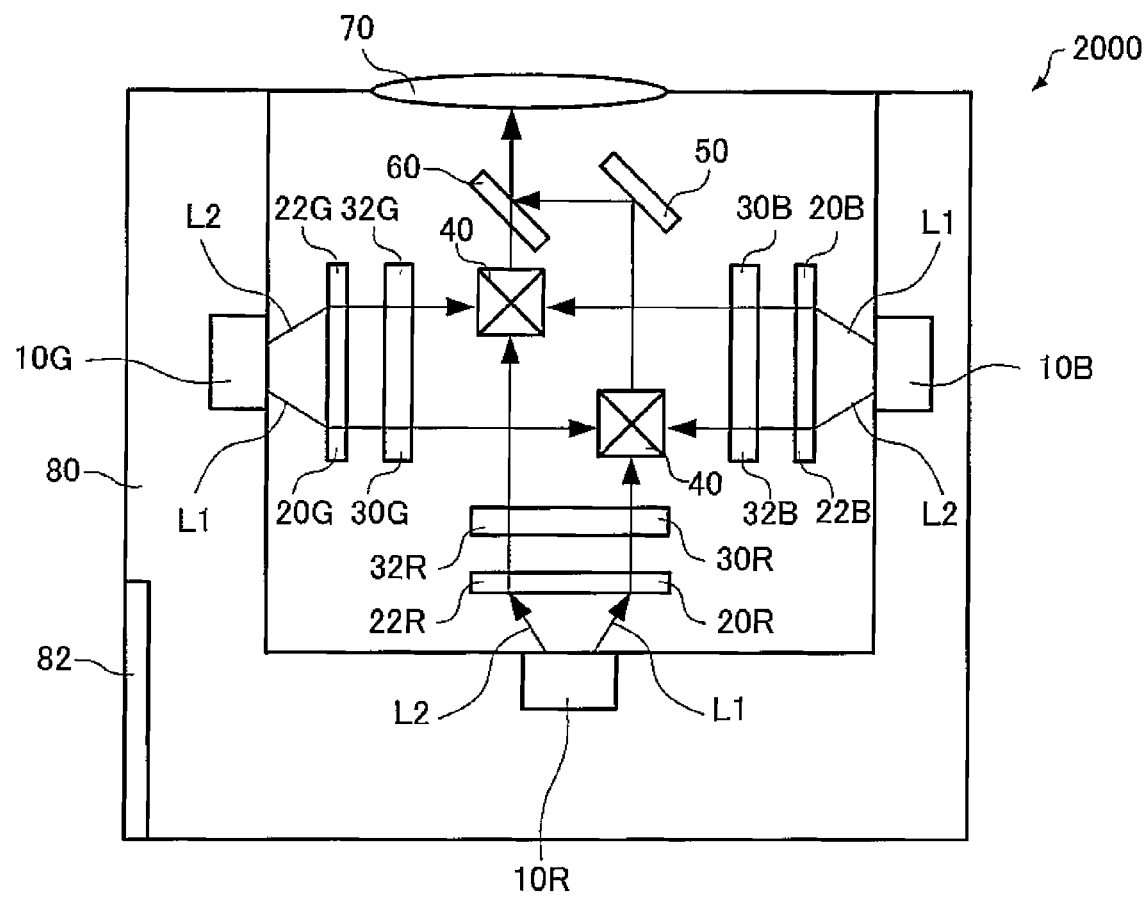
FIG. 7 is a diagram schematically showing a projector according to a second modified example.

Then, a second modified example will be described hereinafter. FIG. 7 is a diagram schematically showing a projector 2000 according to the present modified example.

In the projector 2000, the first diffractive optical elements 20R, 20G, and 20B and the second diffractive optical elements 22R, 22G, and 22B disposed with respect to the light emitting devices 10R, 10G, and 10B can be integrated, respectively. For example, the first and the second diffractive optical element 20R, 22R disposed with respect to the red light emitting device 10R can be integrated. The same can be applied to the green and the blue light emitting device 10G, 10B. Thus, since the number of components can be reduced, cost reduction and downsizing can be achieved.

In the projector 2000, the first light modulation devices 30R, 30G, and 30B and the second light modulation devices 32R, 32G, and 32B disposed with respect to the light emitting devices 10R, 10G, and 10B are integrated, respectively. For example, the first and the second light modulation device 30R, 32R disposed with respect to the red light emitting device 10R can be integrated. The same can be applied to the green light and the blue light emitting device 10G, 10B. Thus, since the number of components can be reduced, cost reduction and downsizing can be achieved.

It should be noted that the embodiment and the modified examples described above are each nothing more than an example, and the invention is not limited thereto. For example, it is also possible to arbitrarily combine the modified examples described above.

As described above, although the embodiment of the invention is explained in detail, it should easily be understood by those skilled in the art that various modifications not substantially departing from the novel matters and the advantages of the invention are possible. Therefore, such modified examples should be included in the scope of the invention.

The entire disclosure of Japanese Patent Application No. 2009-197790, filed Aug. 28, 2009 is expressly incorporated by reference herein.

What is claimed is:

1. A projector comprising:
at least one light emitting device having a light emitting element adapted to emit a first outgoing light and a second outgoing light proceeding in a direction different from a direction of the first outgoing light;
a first light modulation device adapted to modulate the first outgoing light in accordance with image information;
a second light modulation device adapted to modulate the second outgoing light in accordance with image information; and
a projection device adapted to project the light modulated by the first light modulation device and the light modulated by the second light modulation device,
wherein the light emitting element is a super luminescent diode provided with a stacked structure having an active layer sandwiched between a first cladding layer and a second cladding layer, and
the active layer has a first emission surface adapted to emit the first outgoing light and a second emission surface adapted to emit the second outgoing light.

2. The projector according to claim 1, wherein
at least part of the active layer constitutes at least one gain region formed by a current channel of the active layer,
a plurality of the gain regions is arranged,
a first surface and a second surface of exposed surfaces of the active layer are disposed opposite to each other in the stacked structure,
a first gain region of the plurality of gain regions is disposed linearly from the first surface to the second surface so as to be tilted with respect to a perpendicular of the first surface toward a clockwise direction in a plan view of the active layer,
a second gain region of the plurality of gain regions is disposed linearly from the first surface to the second surface so as to be tilted with respect to the perpendicular of the first surface toward a counterclockwise direction in the plan view of the active layer,
the first emission surface corresponds to an end surface of the first gain region on the second surface, and
the second emission surface corresponds to an end surface of the second gain region on the second surface.

3. The projector according to claim 1, wherein
at least part of the active layer constitutes at least one gain region formed by a current channel of the active layer,
a first surface and a second surface of exposed surfaces of the active layer are disposed opposite to each other in the stacked structure,
the gain region is disposed linearly from the first surface to the second surface so as to be tilted with respect to a perpendicular of the first surface in a plan view of the active layer,
the first emission surface corresponds to an end surface of the gain region on the first surface,
the second emission surface corresponds to an end surface of the gain region on the second surface, and
the light emitting device includes
a first mirror adapted to make the first outgoing light enter the first light modulation device, and
a second mirror adapted to make the second outgoing light enter the second light modulation device.

4. The projector according to claim 3, wherein
a plurality of the gain regions is arranged.

5. The projector according to claim 1 further comprising:
a first diffractive optical element disposed on a light path of the first outgoing light between the light emitting device and the first light modulation device, and adapted to diffract the first outgoing light to thereby homogenize an intensity distribution of the light; and
a second diffractive optical element disposed on a light path of the second outgoing light between the light emitting device and the second light modulation device, and adapted to diffract the second outgoing light to thereby homogenize an intensity distribution of the light.

6. The projector according to claim 5, wherein
the first diffractive optical element and the second diffractive optical element are integrated.

7. The projector according to claim 1, wherein
the first light modulation device and the second light modulation device are integrated.

8. The projector according to claim 1, wherein
a plurality of the light emitting devices is disposed,
the plurality of light emitting devices emits light with colors different from each other, and
the projector further comprises a color combining device adapted to combine a plurality of colored light each modulated by the first light modulation device and the second light modulation device.

* * * * *